United States Patent [19]
Souslin

[11] 3,976,100
[45] Aug. 24, 1976

[54] AERIAL REFUELING APPARATUS

[75] Inventor: Richard E. Souslin, Seattle, Wash.

[73] Assignee: The Boeing Company, Seattle, Wash.

[22] Filed: May 13, 1974

[21] Appl. No.: 469,094

[52] U.S. Cl. ........................... 137/614.03; 137/599; 244/135 A; 141/346
[51] Int. Cl.² ........................................ F16L 29/00
[58] Field of Search .................. 137/614–614.06, 137/613, 212, 344, 588, 594, 599; 244/135, 135 A; 285/131, 133 R, 137 R; 141/346, 347, 348, 349, 351, 382, 291–295

[56] References Cited
UNITED STATES PATENTS

| | | | |
|---|---|---|---|
| 382,023 | 5/1888 | Bauer | 141/292 |
| 615,623 | 12/1898 | King | 137/614.03 |
| 1,987,919 | 1/1935 | Wells | 137/599 |
| 2,471,798 | 5/1949 | Thomas | 137/614.03 |
| 2,733,079 | 1/1956 | Worlidge | 137/614.03 |
| 2,896,971 | 7/1959 | Kolar | 251/149.7 |
| 3,171,448 | 3/1965 | Fromm | 137/588 |
| 3,211,178 | 10/1965 | Kiszko | 137/614.04 |
| 3,283,780 | 11/1966 | Sutton | 137/614.04 |
| 3,287,031 | 11/1966 | Simmons et al. | 285/27 |
| 3,596,810 | 8/1971 | Taubenheim | 137/212 |
| 3,640,320 | 2/1972 | Elkuch | 137/588 |

FOREIGN PATENTS OR APPLICATIONS

| | | | |
|---|---|---|---|
| 1,105,615 | 3/1968 | United Kingdom | 137/322 |

*Primary Examiner*—Martin P. Schwadron
*Assistant Examiner*—H. Jay Spiegel
*Attorney, Agent, or Firm*—Christensen, O'Connor, Garrison & Havelka

[57] ABSTRACT

Disclosed is sectional aerial refueling apparatus including a high capacity nozzle unit and a high capacity receptacle unit into which the nozzle is insertable. The probe-like forward end of the nozzle also is insertable into a prior art-type, low capacity receptacle. The nozzle has an inner fuel passage terminating at a port in its front end and an outer fuel passage extending through the side of the nozzle and terminating there in an outer port. The inner and outer fuel passages are normally closed by independently operable poppet valves which remain closed until the nozzle is inserted into a receptacle. The high capacity receptacle includes inner and outer fuel passages which in turn respectively terminate in inner and outer ports. The latter fuel passages are normally closed by independently operable poppet valves which remain closed until the nozzle and the receptacle are engaged. The nozzle and high capacity receptacle each include valve actuators which, during engagement of the nozzle and receptacle, engage and force open the poppet valves of the other so as to bring the fuel passages in the nozzle into communication with those in the receptacle thereby to form a composite inner fuel passage and a composite outer fuel passage. Only the forward portion of the front nozzle housing can be inserted into the prior art type of low capacity receptacle, leaving the rear nozzle poppet valve closed and outside the receptacle.

27 Claims, 7 Drawing Figures

(PRIOR ART RECEPTACLE)

AERIAL REFUELING APPARATUS

BACKGROUND OF THE INVENTION

This invention relates to sectional aerial refueling apparatus, and more specifically to an aerial refueling nozzle and a receptacle therefor.

It is expected that refueling rates of at least 2000 to 2400 gallons per minute will be needed for advanced, high-capacity receiver aircraft expected to be operational in the near future. These rates are over twice the practical flow limits of currently operational aerial refueling apparatus. One way to satisfy the need for higher capacity apparatus would be to refit existing tanker aircraft and provide future tanker aircraft with larger, higher-capacity refueling booms and nozzles similar in structure to those currently in use. This approach, however, would render tankers equipped with the larger booms and nozzles incompatible with existing receiver aircraft equipped with smaller receptacles. Refitting all existing receiver aircraft with larger prior art-type receptacles would be prohibitively expensive. Although tankers could be equipped with one boom and interchangeable nozzles, one for large receptacles and one for small receptacles, it would be impractical to operate so-equipped tankers with a mixed flight of aircraft having small and large receptacles since only one nozzle could be installed at a time. The structural complexity that would be involved in equipping a tanker with multiple booms for the high and low capacity nozzles would create an almost intolerable increase in weight and operating costs and therefore, renders this possibility impractical.

It is a broad object of the present invention to provide aerial refueling nozzles and receptacles therefor that satisfy the above-mentioned need for higher-capacity refueling apparatus without creating the problems that would result from the use of larger, prior art-type apparatus. Another object is to provide high capacity aerial refueling nozzles that are not only operable with the high capacity receptacles of the present invention but also with currently operational low capacity receptacles. A related object is to provide a refueling nozzle operable alternatively in a high flow mode or a low flow mode, depending upon the type and flow capacity of the receptacle into which it is inserted.

Another object is to provide a high capacity aircraft refueling nozzle that may be mounted on presently operational tanker aircraft with limited pumping capacity to be operated at relatively low flow rates with low capacity receptacles on existing receiver aircraft until future receiver aircraft equipped with high capacity receptacles of this invention become operational, at which time the pumping capacity of low capacity tanker aircraft so equipped may be increased by adding additional pumps thereto to meet the aerial refueling needs of such future receiver aircraft.

SUMMARY OF THE INVENTION

Briefly, the present invention is directed to an aerial refueling nozzle and to an aerial refueling receptacle. The nozzle has a probe-like forward end that is insertable into a rearwardly opening cavity in the receptacle. (The terms "front", "rear", "forward", and "rearward" as used herein and in the appended claims refer to portions of the nozzle and the receptacle without relation to the normal direction of flight of an aircraft equipped with the nozzle or receptacle.) Both the nozzle and the receptacle have inner and outer fuel passages. The inner nozzle passage terminates in an inner nozzle port in the forward end of the nozzle while the outer nozzle passage extends through the side of the nozzle and terminates there in an outer nozzle port spaced rearwardly from the inner nozzle port. The inner receptacle passage terminates in an inner receptacle port at the forward end of the receptacle cavity while the outer receptacle passage terminates in an outer receptacle port spaced rearwardly from the inner receptacle port along the side of the cavity. The ports in the nozzle and receptacle are so disposed that upon full insertion of the nozzle into the receptacle the inner passages intercommunicate to form an inner composite fuel passage and the outer passages intercommunicate to form an outer composite fuel passage.

In the presently preferred embodiment, each of the fuel passages is normally closed by a forwardly biased poppet valve. During insertion of the nozzle into the receptacle, actuator means in the receptacle and nozzle engage and cause rearward displacement of the poppet valves in the other unit. The preferred nozzles of this invention include generally tubular, coaxial, front and rear housing sections, the forward end of the rear section being spaced rearwardly from the rear end of the forward section to define therebetween the outer nozzle port. Adjacent this port is a generally tubular outer nozzle poppet valve coaxial with the rear housing section and forwardly biased toward engagement with the rear end of the front housing section for closing the outer nozzle passage.

Other features, objects and advantages of the present invention will become evident from the following description and the accompanying drawings.

BRIEF DESCRIPTION OF THE DRAWINGS

FIG. 7 is a transverse vertical cross-section (taken along line B—B of FIG. 6) of the nozzle of FIG. 1 fully inserted into the receptacle of FIG. 1.

DETAILED DESCRIPTION OF THE DRAWINGS AND PREFERRED EMBODIMENTS

Figure 1:
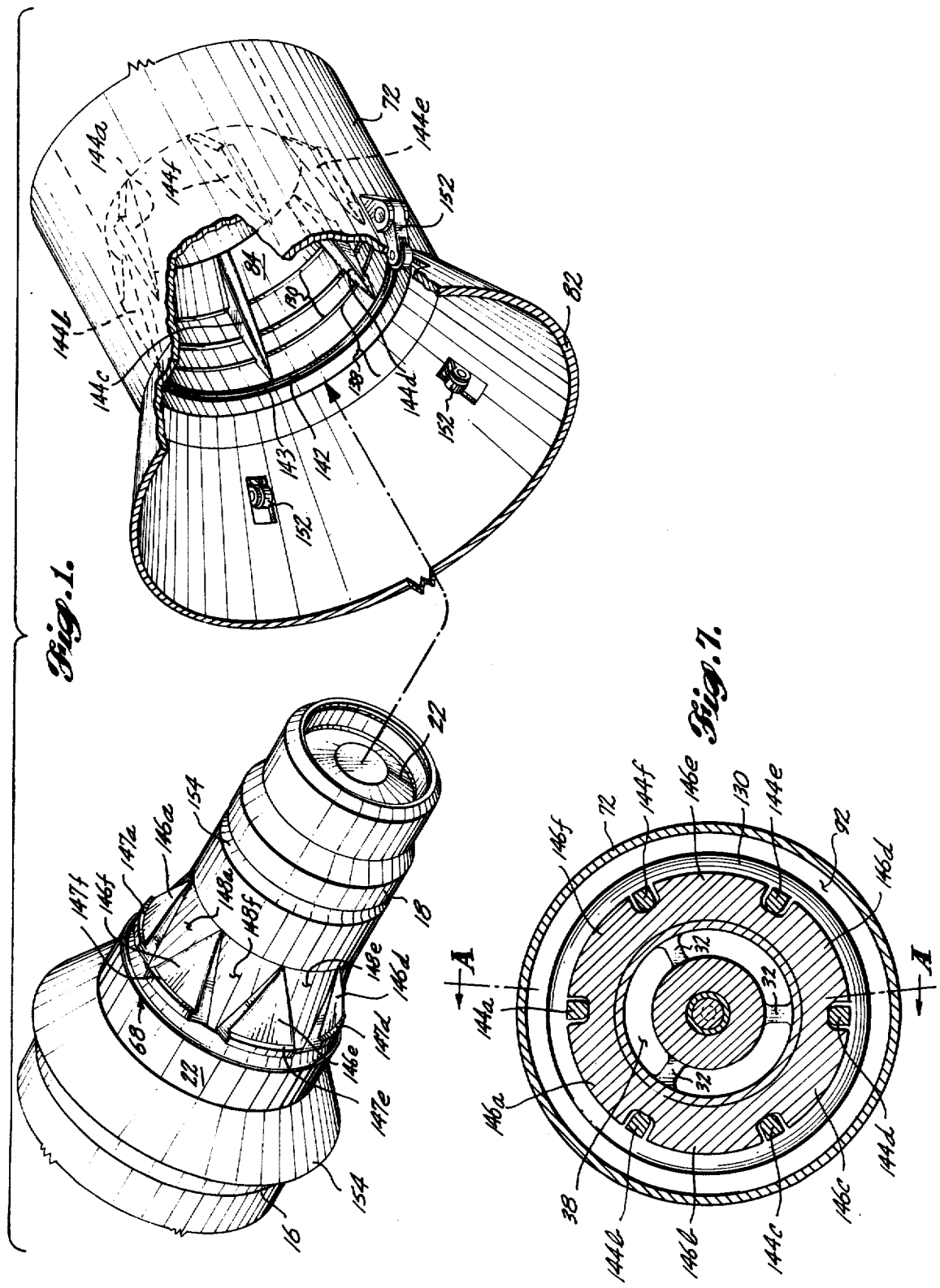
FIG. 1 is an isometric view of a preferred nozzle and a preferred receptacle of the present invention with part of the receptacle broken away.
Figure 2:
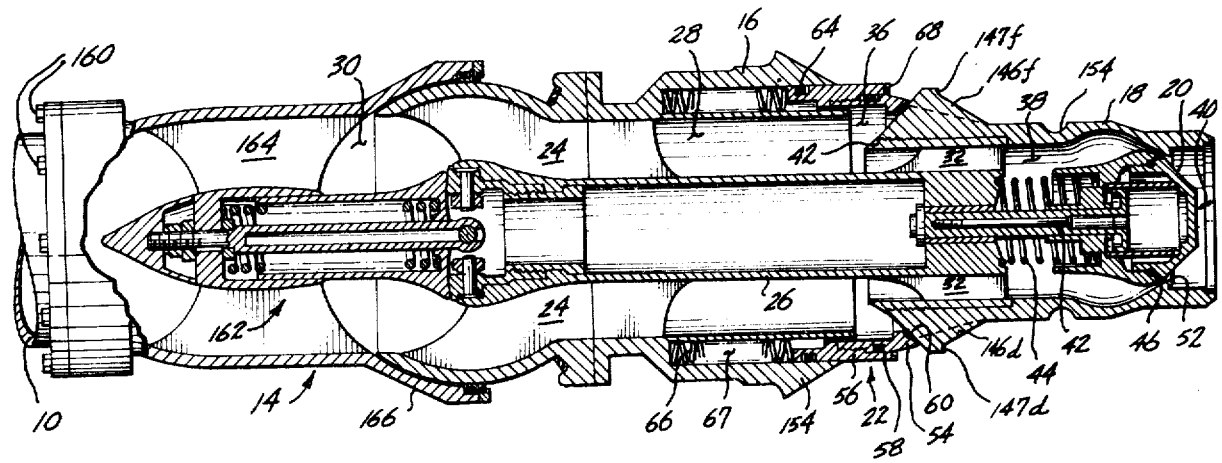
FIG. 2 is a longitudinal cross-section of the nozzle of FIG. 1 taken along line A—A of FIG. 7.
Figure 3:
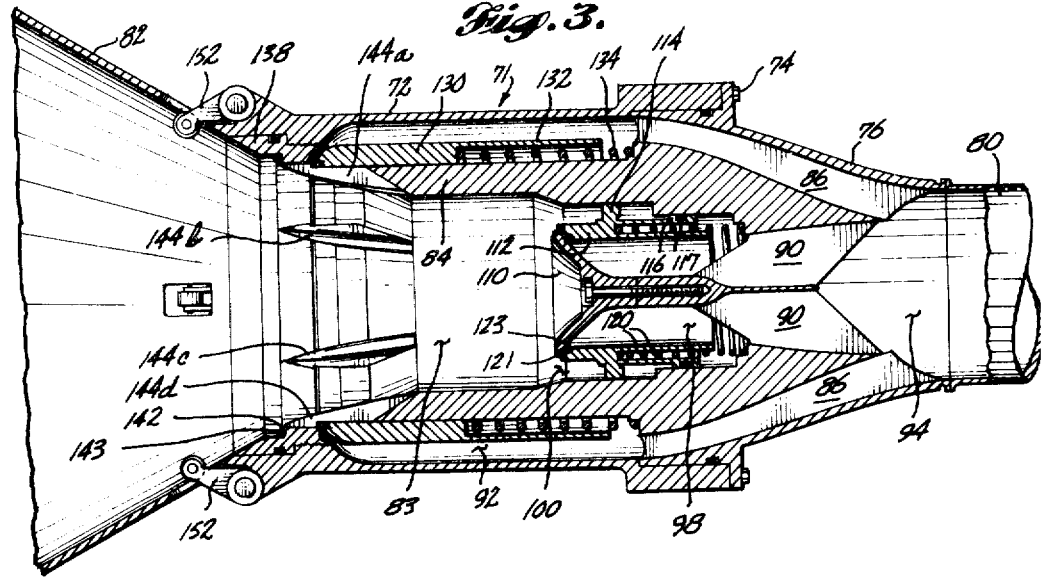
FIG. 3 is a longitudinal cross-section of the receptacle of FIG. 1 taken along line A—A of FIG. 7.

The interior and exterior details of the preferred embodiments of the nozzle and receptacle of this invention are best shown in FIGS. 1–3. The nozzle is typically mounted on the end of a boom 10 (FIG. 2) depending from the tail of a tanker aircraft (not shown). The nozzle is connected to the boom by a universal joint assembly generally designated 14 (described more fully hereinafter) which biases the nozzle toward a position in which it is axially aligned with the boom.

As shown most clearly in FIG. 2, the nozzle includes a generally tubular shaped rear housing 16 and a generally tubular shaped forward housing 18 coaxial with but smaller in diameter than the rear housing. The rear housing 16 is supported by three spiders 24 radiating from a tubular center core 26 which is in turn pivotally supported from the universal joint assembly 14. Extending through the rear housing 16 is a main fuel passage 28 which surrounds the center core 26 and communicates with the boom 10 via a fuel passage 30 through the universal joint assembly.

The front housing 18 is supported from the forward end of the core 26 by three radially extending spiders 32. An inner fuel passage 38 communicating with the main fuel passage 28 extends around the center core and through the front housing and terminates in the front end of the nozzle in an inner port 40 (FIG. 2). (As used herein and in the appended claims, the "front end" of the nozzle is simply the end that is first inserted into the "rear end" of the receptacle.) Situated adjacent to and rearwardly of the inner port 40 is an inner nozzle poppet valve 20 mounted for axial movement along a guide rod 42 connected to the forward end of the center core 26. A coil spring 44 compressed between the forward end of the center core 26 and the rear of the inner poppet valve 20 biases the valve forwardly toward its normal position closing the inner fuel passage 38. At this closed position, a sealing ring 46 on the front face of the inner poppet valve 20, is compressed against the rear of an inwardly projecting lip 52 on the interior of the front housing 18. This lip is engageable with and serves as an actuator for the inner receptacle poppet valve to be described.

Figure 4:
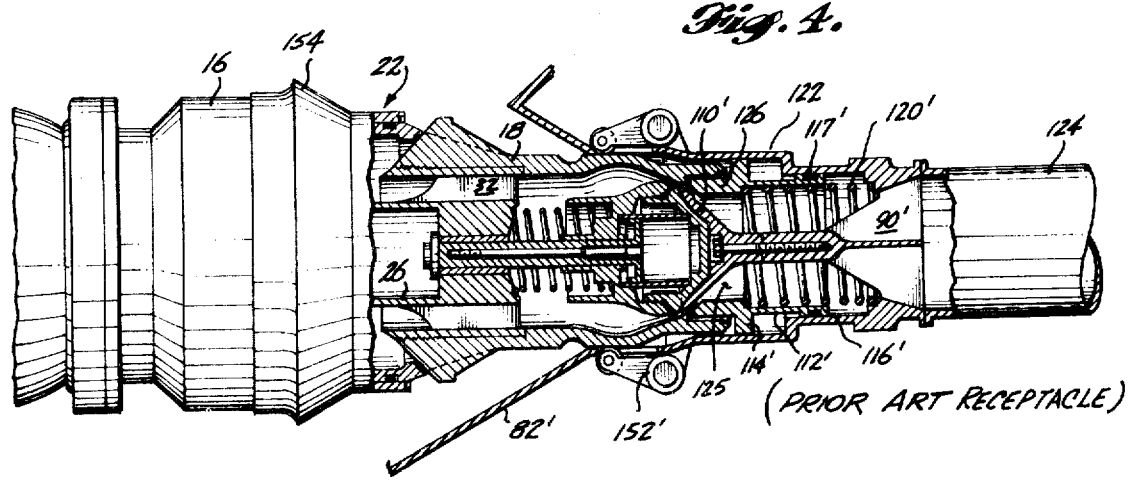
FIG. 4 is a partial longitudinal cross-section of the nozzle of FIG. 1 (taken along line A—A of FIG. 7) with its forward end inserted into a low capacity prior art receptacle.
Figure 6:
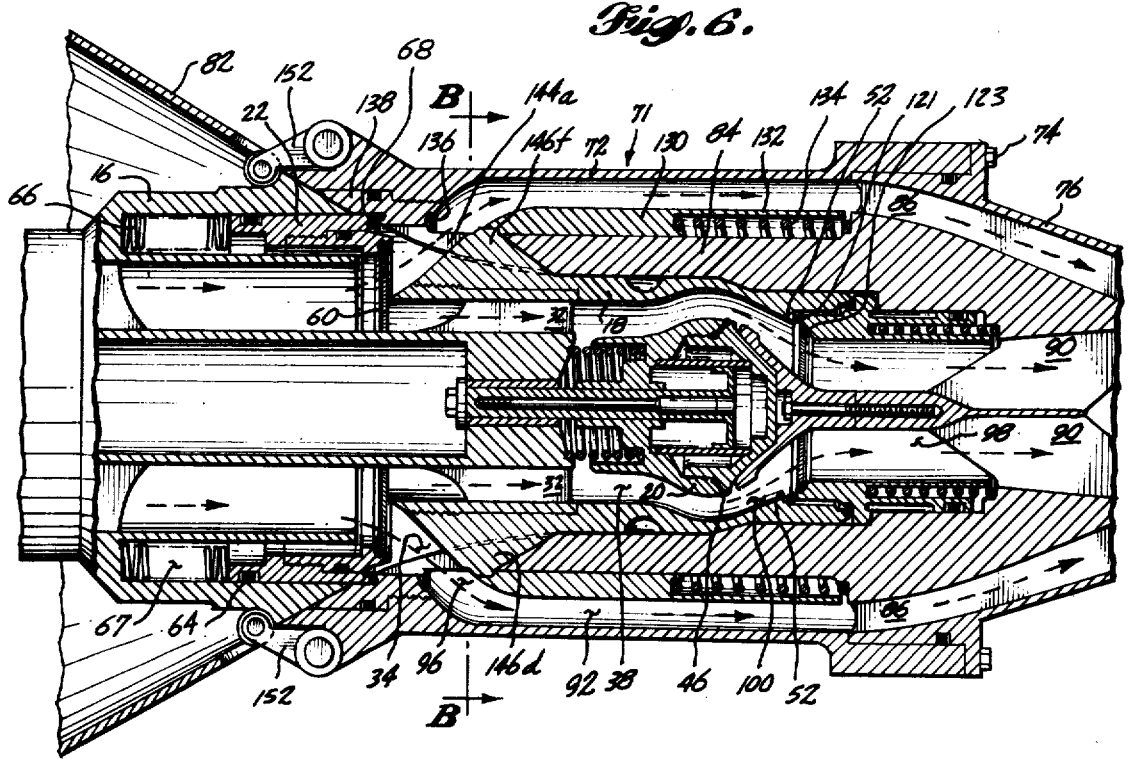
FIG. 6 is a longitudinal cross-section similar to FIG. 5 of the nozzle of FIG. 1 fully inserted into the receptacle of FIG. 1.

Fuel flowing through the inner fuel passage 38 flows around the inner poppet valve 20, as shown in FIG. 6. The interior configuration of the front housing 18 is bulbulous in the vicinity of the valve's open position (see FIG. 6) so that the cross sectional area of the inner fuel passage is essentially uniform along its length. So that the nozzle can be mated with prior art low capacity receptacles as shown in FIG. 4, the exterior of the forward segment of the forward housing 18 and the inner poppet valve 20 are essentially identical in configuration to those of the prior art low capacity nozzles referred to previously.

The forward end of the rear nozzle housing is spaced rearwardly from the rear end of the front housing so as to define therebetween an outer nozzle fuel passage 36 communicating with the main fuel passage 28. The outer fuel passage thus extends through the side of the nozzle and terminates there in an outer port 34 (see FIG. 6) spaced rearwardly from the inner port 40 and extending around the exterior circumference of the nozzle. A flow divider 42 on the rear end of the front housing 18 divides the flow of fuel from the main fuel passage 28 between the inner and outer fuel passages.

Situated adjacent the outer nozzle port 34 is a generally tubular outer nozzle poppet valve 22 which normally closes the outer fuel passage 36. This valve is coaxial with the rear housing 16 and is comprised of two cylindrical parts 54 and 56 threadedly connected with a sealing O-ring 58 therebetween. A Belville spring stack 66 contained within a chamber 67 in the rear housing 16 biases the valve 22 forwardly toward its normal position closing the outer fuel passage 36. The outer poppet valve 22 is retracted into the chamber 67 during rearward opening movement thereof (see FIG. 6). At the closed position of the outer poppet valve 22, a sealing ring 60 on the forward edge of the valve is in sealing engagement with the rear end of the front housing 18. Another O-ring 64 provides a seal between the rear of the valve and the rear housing 16. The outer poppet valve includes a forwardly facing lip 68 (FIG. 2) which, as described hereinafter, is engageable by an actuator for the valve on the receptacle of this invention.

Referring now to FIG. 3, there is shown a preferred high capacity receptacle of the present invention. The receptacle includes an outer housing, designated generally as 71 which is comprised of a rear housing section 72 bolted to a front housing section 76. The front housing section 76 is in turn connected to a main fuel conduit 80 (FIG. 3) which communicates with the fuel tanks of a receiver aircraft (not shown). The rear end of the rear housing 72 includes a conical nozzle guide chute 82 leading from an opening in the aircraft fuselage.

An inner receptacle housing 84 is supported within and from the front section of the outer housing 76 by three spiders 86. Portions of the interior surfaces of the inner and outer receptacle housings together define a cavity 83 opening to the rearward end of the receptacle. It is into this cavity that the forward segment of the nozzle is inserted. The inner housing 84 is coaxial with but of substantially smaller diameter than the outer housing 71 such that an outer fuel passage 92 is in part defined by the exterior of the inner housing and the interior of the outer housing. This passage communicates with a main fuel passage 94. The outer fuel passage 92 extends the full length of the inner housing 84 and terminates there in an outer receptacle port 96 (see FIG. 6) facing inwardly at the side of the receptacle cavity 83 and extending therearound.

The outer fuel passage 92 is normally closed by a cylindrical outer poppet valve 130 slidably situated between and coaxially with the inner and outer housings adjacent the outer port 96. The outer poppet valve 130 has an extension skirt 132 which conforms the outer surface of the valve to the forward portion of the exterior of the inner housing 84 so that when the valve 130 is moved forwardly to its open position (see FIG. 6) the valve and the exterior of the forward position of the inner housing together define a smooth, continuous inner surface of the outer fuel passage. A coil spring 134 encircling the rear portion inner housing and disposed between it and the extension skirt 132 biases the outer poppet valve 130 rearwardly toward its normally closed position where the rear end of the valve is in sealing engagement with a sealing ring 136 on a valve seat 138 threaded into the outer housing 72 at the rear end of the receptacle cavity. The valve seat 138 includes a rearwardly facing recess, the inner margin of which is defined by a rearwardly extending lip 142. Contained within this recess is a sealing ring 143 which, during insertion of the nozzle into the receptacle, engages the forwardly facing lip 68 on the outer poppet valve 22, of the nozzle.

Situated at the forward end of the receptacle cavity 83 and centered with respect thereto is a disc-shaped valve seat 110 which is bolted to and supported by three spiders 90 depending from the forward end of inner housing 84. The front face of the seat is convex and the rear face concave. Extending through the inner receptacle housing 84 is an inner fuel passage 98 which terminates in an inner port 100 at the forward end of the receptacle cavity (see FIG. 6), the port being defined by the peripheral edge of the valve seat 110 and the adjacent interior surface of the inner housing.

Immediately forward of the inner port is a generally cylindrical inner poppet valve 112 oriented coaxially with the inner housing. The valve has two spaced-apart, belt-like projections 114 and 116 extending therearound and slidably engaging similarly-diametered surfaces on the interior of the inner housing 84. An O-ring 117 situated in a recess in the forward belt-like projection 116 provides a seal between the valve 112 and the inner housing 84. The inner poppet valve 112 is biased rearwardly toward its closed position by a coil spring 120. At this closed position, a seal ring 121 on the rear end of the rear poppet valve contacts the forward face of the valve seat 110.

By comparing FIGS. 3 and 4, it will be seen that the prior art receptacle of FIG. 4 includes a poppet valve 126 and a valve seat therefor 110' that are generally similar to the inner poppet valve 112 and the valve seat therefor 110 in the receptacle of this invention shown in FIG. 3. Referring to the prior art receptacle shown in FIG. 4, a tubular housing 122 is connected with a main fuel conduit 124 leading to the fuel tanks of a receiver aircraft (not shown). The housing 122 defines a single fuel passage 125 extending through the receptacle to the main fuel conduit 124. The fuel passage 125 is opened and closed by poppet valve 126. The remaining elements of the prior art receptacle are substantially identical or very similar in structure, function and operation to those elements of the receptacle of FIG. 3 that are identified by the same but unprimed numerals. The details of the prior art receptacle of FIG. 4 will therefore be readily understood from the description and discussion of the receptacle of this invention shown in FIG. 3.

The preferred receptacle of this invention also includes six guide fins 144a–144f, which are best shown in FIGS. 1 and 3. These fins extend generally parallel to the longitudinal axis of the receptacle. The fins are evenly spaced apart around and extend into the receptacle cavity 83. It will be noted that the guide fins extend across the outer fuel passage port 96 and valve seat 138 and are tapered inwardly from their rearward ends. One purpose of the fins is to guide the front end of the nozzle into the forward portion of the receptacle cavity and another is to prevent the forward portion nozzle from engaging the outer receptacle poppet valve 130. Referring now to the nozzle shown in FIG. 1, it will be seen that on the exterior of the rear portion of the front housing 18 there are six, forwardly tapered, spaced-apart shoulders 146a–146f. These shoulders define six, rearwardly converging channels 148a–f for receiving the guide fins 144a–f of the receptacle. The width of the rearward segment of each of these channels and the width of the rearward segment of each of the guide fins is such that upon insertion of the nozzle into the receptacle, the guide fins become trapped in the channels between the adjacent portions of the shoulders (see FIG. 7) and relative rotation between the coupled nozzle and receptacle is limited. This limitation of relative rotation between the nozzle and the receptacle minimizes wear and strain on engaging parts of the nozzle and the receptacle and even makes possible the incorporation of electrical and/or hydraulic connections between the nozzle and the receptacle.

Figure 5:
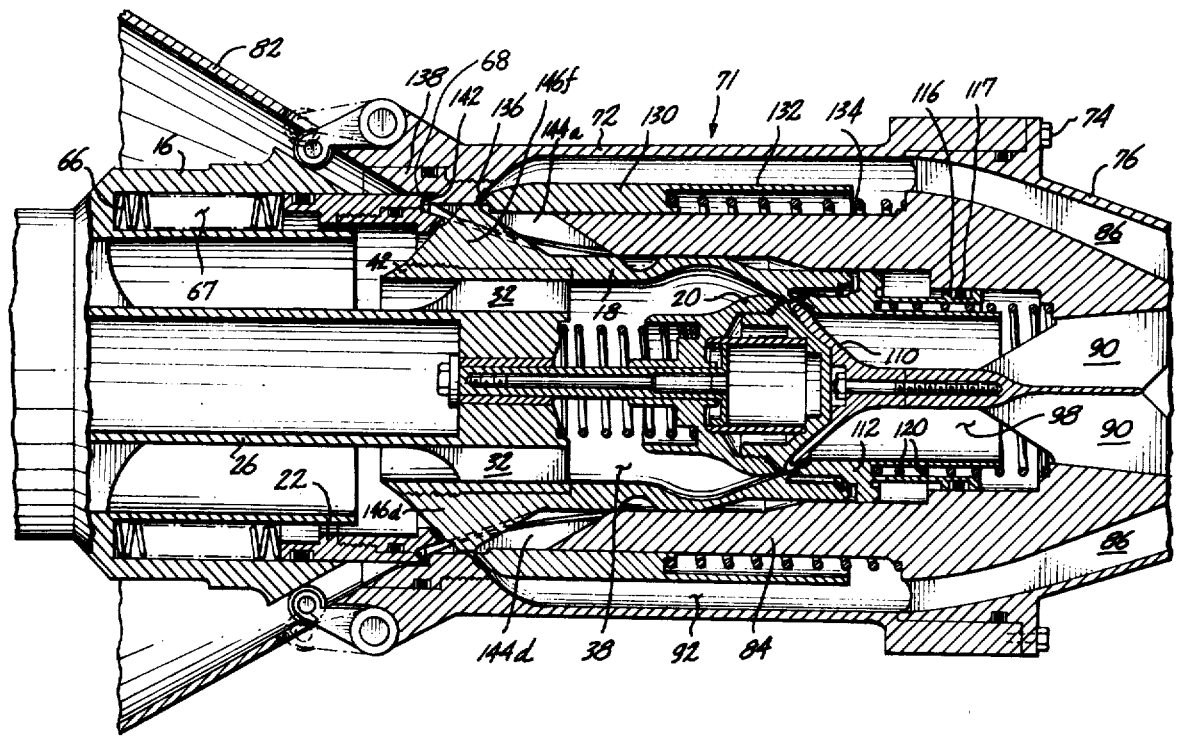
FIG. 5 is an enlarged longitudinal cross-section of the nozzle of FIG. 1 (taken along line A—A of FIG. 7) being inserted into the high capacity receptacle of FIG. 1.

As can best be seen by reference to FIGS. 5 and 6, the poppet valves of the nozzle are displaced rearwardly during insertion of the nozzle into the receptacle and the receptacle poppet valves are displaced forwardly during insertion. Specifically, the inner nozzle poppet valve 20 is engaged and displaced rearwardly by contact with the disc-shaped valve seat 110 of the receptacle, the shape of the concave rear face of the valve seat being complimentary to that of the convex forward face of the inner nozzle poppet valve 20. Simultaneously with contact between the inner nozzle poppet valve 20 and the receptacle valve seat 110, the inwardly projecting lip 52 in the front end of the nozzle engages the rearward edge of the inner receptacle poppet valve 112, there being a circular sealing ring 123 on that rear edge which assures a seal between the lip 52 and the inner receptacle poppet valve. upon continued advancement of the nozzle into the receptacle, the lip 52 of the nozzle forces the inner receptacle poppet valve 112 forwardly while the valve seat 110 forces the inner nozzle poppet valve 20 rearwardly. The inner fuel passages of the nozzle and the receptacle are thus caused to intercommunicate to form an inner composite fuel passage extending through the nozzle and receptacle.

Referring specifically, to FIG. 5, it will be seen that just prior to complete insertion of the nozzle into the receptacle, the forwardly facing lip 68 on the outer nozzle poppet valve 22 is engaged by the sealing ring 142 in the valve seat 138 at the rear of the receptacle cavity. At the same time, outwardly extending lips 147a–f on the rear of the tapered shoulders 146a–f on the nozzle engage the outer receptacle poppet valve 130. As shown in FIG. 6, continued insertion of the nozzle into the receptacle causes rearward opening movement of the outer nozzle poppet valve 22 and forward opening movement of the outer receptacle poppet valve 130. The outer fuel passages of the nozzle and receptacle are thus caused to intercommunicate to form an outer composite fuel passage extending through the nozzle and receptacle.

By comparing FIGS. 4 and 5, it will be seen that only the forward segment of the forward nozzle housing 18 is insertable into the prior art low capacity receptacle, whereas the entire forward nozzle housing 18 together with the forward segment of the rear nozzle housing 16 is insertable into the high capacity receptacle of this invention. Thus, the outer nozzle poppet valve remains closed when the nozzle is inserted into the prior art receptacle and fuel is transferred only through the opened inner nozzle fuel passage 38 to the opened receptacle fuel passage 125. In contrast, fuel is transferred through both the inner and outer nozzle fuel passages when the nozzle is inserted into the high capacity receptacle of this invention.

As will be apparent from the drawings and foregoing description, the poppet valves in the nozzle and receptacle do not open until seals are established between the nozzle and receptacle fuel passages and they return to their closed positions before the seals are broken during separation of the nozzle and receptacle. This assures that fuel spillage will be minimal.

When mated with the high capacity receptacle of this invention, the nozzle is latched thereto by a plurality of conventional inwardly biased, roller latches 152 extending through apertures in the guide chute 82. During insertion of the nozzle into the receptacle, the latches travel outwardly along and then behind a cam 154 on the exterior of the rear nozzle housing 16 (see FIGS. 5 and 6). When mated with a prior art receptacle, as shown in FIG. 4, similar roller latches 152' on the receptacle engage a detent 154 extending around the exterior of the front nozzle housing 18.

The aforementioned universal joint assembly 14, which is of conventional design, is dependently mounted from the tanker boom 10 by a plurality of mounting bolts 160. The joint includes a centering mechanism 162 tending to bring the nozzle and boom into coaxial alignment with each other. The centering mechanism is supported by a plurality of spiders 164 extending inwardly from an external housing 166. The center core 26 of the nozzle is connected to the forward end of the shock absorbing mechanism such that the nozzle is pivotal in all directions relative to the boom.

Although it is preferred that the valves in the nozzle and receptacle of this invention open simultaneously during insertion, it will be apparent that this is not essential. It will also be apparent that remote controlled electrical or hydraulic actuators could be used to effect opening of the valves in the nozzle and/or receptacle. Indeed, if the inner and outer nozzle fuel passages were to originate elsewhere than in the nozzle, e.g., in the boom or in the tanker aircraft proper, it would not be essential to include any valves in the nozzle. The inclusion of valves in the receptacles of this invention is also not essential. By reference to FIG. 6, it will be recognized that fuel may flow in either direction through the composite inner and outer fuel passages and thus the nozzle and the receptacle could be used on receiver and tanker aircraft, respectively.

It will be appreciated that various modifications and changes can be made in the preferred embodiments described herein without departing from the spirit or scope of the present invention. It is to be understood, therefore, that the foregoing description and accompanying drawings are intended to be only illustrative of the invention and that the true spirit and scope of the invention is to be determined by reference to the appended claims.

What is claimed is:

1. Sectional, aerial refueling apparatus comprising a nozzle unit and a receptacle unit, the nozzle having a probe-like forward segment and the receptacle having a cavity opening to the rearward end thereof into which cavity the forward segment of the nozzle is insertable, each of said units having an inner fuel passage and an outer fuel passage, said inner and outer nozzle passages merging into a common main fuel passage at the rear of said nozzle, and said inner and outer receptacle passages merging into a common main passage disposed adjacent the forward end of said receptacle, the inner nozzle passage terminating in an inner nozzle port in the forward end of the nozzle, and a forwardly biased, inner nozzle poppet valve adjacent the inner nozzle port for normally closing the inner nozzle passage, and the receptacle further having an inner valve actuator means for engaging and causing rearward displacement of said inner nozzle poppet valve during insertion of the nozzle into the receptacle, the outer nozzle passage extending through the side of the nozzle and terminating there in an outer nozzle port spaced rearwardly from the inner nozzle port, the inner receptacle passage terminating in an inner receptacle port at the forward end of the receptacle cavity and the outer receptacle passage terminating in an outer receptacle port spaced rearwardly from the inner receptacle port along the side of the cavity, the inner ports and outer ports of the units being so disposed that upon full insertion of the nozzle into the receptacle the inner passages intercommunicate to form an inner composite fuel passage and the outer passages intercommunicate to form an outer composite fuel passage with both said inner and outer composite fuel passages communicating with said main fuel passages during said full insertion.

2. The apparatus of claim 1 wherein the inner nozzle poppet valve includes a passage closure member having a convex forward face and the inner valve actuator means of the receptacle comprises a disc-shaped member having a concave rear face complimentary to and engageable with the forward face of the inner nozzle poppet valve.

3. The apparatus of claim 2 wherein said inner receptacle port extends around the peripheral edge of the disc-shaped member, wherein the receptacle further comprises a rearwardly biased inner receptacle poppet valve adjacent the inner receptacle port for normally closing the inner receptacle passage, the inner receptacle poppet valve comprising a cylindrical passage closure member the rearward end of which is engageable with the forward face of the disc-shaped member to close the inner receptacle passage, and wherein the nozzle further comprises inner valve actuator means for engaging the inner receptacle poppet valve and causing forward displacement of the cylindrical passage closure member during insertion of the nozzle into the receptacle.

4. The apparatus of claim 1 wherein the receptacle further comprises a rearwardly biased inner receptacle poppet valve adjacent the inner receptacle port for normally closing the inner receptacle passage and wherein the nozzle further comprises inner valve actuator means for engaging and causing forward displacement of the inner receptacle poppet valve during insertion of the nozzle into the receptacle.

5. The apparatus of claim 4 wherein the inner valve actuator means are so disposed that upon insertion of the nozzle into the cavity the inner poppet valve of the nozzle and receptacle are opened substantially simultaneously.

6. The apparatus of claim 4 wherein the outer nozzle port extends substantially completely around the exterior of the nozzle and the outer receptacle port extends substantially completely around the cavity.

7. The apparatus of claim 6 wherein the nozzle further comprises outer nozzle valve means normally closing the outer nozzle passage.

8. The apparatus of claim 6 wherein the nozzle further comprises a forwardly biased outer nozzle poppet valve for normally closing the outer nozzle passage and the receptacle further comprises outer valve actuator means for engaging and causing rearward displacement of the outer nozzle poppet valve during insertion of the nozzle into the receptacle.

9. The apparatus of claim 1 wherein the outer nozzle port extends substantially completely around the exterior of the nozzle and the outer receptacle port extends substantially completely around the cavity.

10. The apparatus of claim 9 wherein the nozzle further comprises outer nozzle valve means normally closing the outer nozzle passage.

11. The apparatus of claim 10 wherein the receptacle further comprises outer receptacle valve means normally closing the outer receptacle passage.

12. The apparatus of claim 9 wherein the nozzle further comprises a forwardly biased outer nozzle poppet valve for normally closing the outer nozzle passage and the receptacle further comprises outer valve actuator means for engaging and causing rearward displacement of the outer nozzle poppet valve during insertion of the nozzle into the receptacle.

13. The apparatus of claim 12 wherein the receptacle further comprises an outer poppet valve normally closing the outer receptacle passage and the nozzle further comprises outer valve actuator means for engaging and causing forward displacement of the outer receptacle poppet valve during insertion of the nozzle into the receptacle.

14. The apparatus of claim 1, wherein the nozzle further comprises generally tubular, coaxial, front and rear housing sections, the forward end of the rear housing section being spaced rearwardly from the rear end of the front housing section to define therebetween the outer nozzle port.

15. The apparatus of claim 14, wherein the nozzle further comprises a generally tubular outer nozzle poppet valve coaxial with the rear housing section and adjacent the outer nozzle port, the outer nozzle poppet valve being forwardly biased toward engagement with the rear end of the front housing section for normally closing the outer nozzle passage.

16. The apparatus of claim 14 wherein the diameter of the rear nozzle housing section is greater than the diameter of the forward housing section.

17. The apparatus of claim 1 wherein the receptacle further comprises at least one guide fin extending generally parallel to the longitudinal axis of the receptacle along the side of the cavity and means on the exterior of the nozzle defining a rearwardly converging channel for receiving the guide fin, the widths of the rearward segment of the channel and the rearward segment of the guide fin being such that upon insertion of the nozzle into the receptacle, relative rotation between the nozzle and receptacle is restricted.

18. An aerial refueling nozzle comprising a generally tubular housing having a probe-like forward end and including generally tubular, coaxial front and rear housing sections, the forward end of the rear section being opposed to but spaced rearwardly from the rear of the front section, the nozzle including an inner fuel passage terminating in an inner port in the forward end of said front housing section and an outer fuel passage extending through the side of the housing and terminating there in an outer port between the forward end of said rear section and the rear of said front section, said housing further having a main fuel passage adjacent the rear of said front section, said inner and outer passages merging into said main fuel passage, inner valve means normally closing the inner fuel passage and outer valve means normally closing the outer fuel passage, the inner and outer valve means being independently actuatable.

19. The nozzle of claim 18 wherein said inner and outer valve means comprises a forwardly biased, inner poppet valve adjacent the inner port for normally closing the inner fuel passage and a forwardly biased outer poppet valve normally closing the outer fuel passage, respectively.

20. The nozzle of claim 18 wherein the outer port extends substantially completely around the exterior of the housing.

21. The nozzle of claim 18 wherein the outer valve means comprises a generally tubular outer poppet valve coaxial with the rear housing section and adjacent the outer nozzle port, the outer poppet valve being forwardly biased towad engagement with the rear end of the front housing section for normally closing the outer passage.

22. An aerial refueling receptacle comprising housing means having a hollow cylindrical shape and defining a cavity therewithin that has an opening at the rear of the receptacle for receiving an aerial refueling nozzle, the receptacle including an inner fuel passage terminating in an inner port at the forward end of the cavity, and an outer fuel passage terminating in an outer port spaced rearwardly from the inner port along the side of the cavity, an inner poppet valve movably mounted adjacent said inner port, and means for rearwardly biasing said inner poppet valve so that it normally closes said inner fuel passage at said inner port; an outer poppet valve having a hollow cylindrical shape, open at both ends, and being slidably and coaxially mounted in said housing means, said outer poppet valve having a rear end that is disposed adjacent said outer port and forward of said opening, and means for rearwardly biasing said outer poppet valve so that it normally closes said outer fuel passage at said outer port; the inner and outer poppet valves being independently actuatable.

23. The receptacle of claim 22 wherein the outer receptacle port extends substantially completely around the cavity.

24. Sectional, aerial refueling apparatus comprising a nozzle unit and a receptacle unit, the nozzle having a probe-like forward segment and the receptacle having a cavity opening to the rearward end thereof into which cavity the forward segment of the nozzle is insertable, each of said units having an inner fuel passage and an outer fuel passage, the inner nozzle passage terminating in an inner nozzle port in the forward end of the nozzle, and a forwardly biased, inner nozzle poppet valve adjacent the inner nozzle port for normally closing the inner nozzle passage, the receptacle having an inner valve actuator means for engaging and causing rearward displacement of said inner nozzle poppet valve during insertion of the nozzle into the receptacle, the outer nozzle passage extending through the side of the nozzle and terminating there in an outer nozzle port spaced rearwardly from the inner nozzle port and extending substantially completely around the exterior of the nozzle, the inner receptacle passage terminating in an inner receptacle port at the forward end of the receptacle cavity and the outer receptacle passage terminating in an outer receptacle port spaced rearwardly from the inner receptacle port along the side of the cavity, and extending substantially completely around the cavity, the receptacle further having a rearwardly biased inner receptacle poppet valve adjacent the inner receptacle port for normally closing the inner receptacle passage and the nozzle further having an inner valve actuator means for engaging and causing forward displacement of the inner receptacle poppet valve during insertion of the nozzle into the receptacle, wherein the inner valve actuator means of the nozzle and receptacle are so disposed that upon insertion of the nozzle into the cavity the inner poppet valves of the nozzle and receptacle are opened substantially simultaneously, the nozzle further having an outer nozzle valve means normally closing the outer nozzle passage and the receptacle further having a separate outer receptacle valve means operable independently of the inner receptacle poppet valve and serving to normally close the outer receptacle passage, the inner and outer ports of said nozzle and receptacle units being so disposed that upon full insertion of the nozzle into the receptacle the inner passages intercommunicate to form an inner composite fuel passage and the outer passages intercommunicate to form an outer composite fuel passage.

25. The apparatus of claim 24, wherein said outer nozzle valve means is a forwardly biased poppet valve, said receptacle further comprising an outer valve actuator means for engaging and causing forward displacement of the outer receptacle poppet valve during the insertion of the nozzle into the receptacle, and wherein the outer receptacle valve means is a rearwardly biased poppet valve, said nozzle further comprising outer valve actuator means for engaging and causing forward displacement of the outer receptacle poppet valve during insertion of the nozzle into the receptacle.

26. An aerial refueling nozzle for optional, alternate insertion into first and second types of aircraft fueling receptacles, the first type of receptacle having a single fuel passage defined by a tubular housing and including detent engagable latching means adjacent the opening thereof for engaging detents on a nozzle that has been inserted therein, and the second type of receptacle having a housing defining a cavity opening to the rear of the receptacle and further defining inner and outer coaxial fuel passages, the inner passage terminating in an inner receptacle port disposed forwardly of the opening of the cavity and said outer passage terminating in an outer receptacle port spaced rearwardly from the inner port along the side of the cavity, said nozzle comprising:
  a generally tubular nozzle housing having a probe-like forward end and an inner fuel passage terminating in an inner nozzle port at the forward end of said nozzle housing;
  a separate outer fuel passage extending through the circumference of said nozzle housing and terminating in an outer nozzle port spaced rearwardly from said inner nozzle port;
  a receptacle actuated inner passage valve means normally closing said inner nozzle port, a receptacle actuated outer passage valve means normally closing said outer nozzle port, said inner passage valve means and said outer passage valve means being independently actuatable; and
  said nozzle housing defining latch engagable detent means on the outer circumference of said probe-like forward end between said inner nozzle port and said outer nozzle port.

27. The nozzle of claim 26, wherein said nozzle housing includes:
  generally tubular, coaxially arranged front and rear housing sections with said front section defining said probe-like forward end, the forward end of said rear section being axially proximate but spaced apart from the rear end of said front section to define therebetween said outer nozzle passage and port.

* * * * *